(12) United States Patent
Kimble

(10) Patent No.: US 8,873,731 B2
(45) Date of Patent: *Oct. 28, 2014

(54) NEXT GENERATION AUTO-DIALER

(71) Applicant: AT&T Intellectual Property I, L.P., Atlanta, GA (US)

(72) Inventor: David Kimble, Danville, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/688,726

(22) Filed: Nov. 29, 2012

(65) Prior Publication Data

US 2013/0089195 A1 Apr. 11, 2013

Related U.S. Application Data

(63) Continuation of application No. 12/467,568, filed on May 18, 2009, now Pat. No. 8,355,493.

(51) Int. Cl.
*H04M 3/42* (2006.01)
*H04M 3/51* (2006.01)
*H04M 3/533* (2006.01)

(52) U.S. Cl.
CPC .............. *H04M 3/42* (2013.01); *H04M 3/5158* (2013.01); *H04M 3/53383* (2013.01)

USPC .. 379/216.01; 379/196; 379/197; 379/266.07

(58) Field of Classification Search
USPC ........................ 379/216.01, 196, 197, 266.07
See application file for complete search history.

(56) References Cited

U.S. PATENT DOCUMENTS

| | | | |
|---|---|---|---|
| 4,916,435 A | 4/1990 | Fuller | |
| 5,315,641 A | 5/1994 | Montgomery et al. | |
| 5,818,930 A | 10/1998 | Mark | |
| 5,946,304 A | 8/1999 | Chapman et al. | |
| 2008/0298347 A1 | 12/2008 | Lowmaster et al. | |

*Primary Examiner* — Quynh Nguyen
(74) *Attorney, Agent, or Firm* — Greenblum & Bernstein, P.L.C.

(57) ABSTRACT

Systems, methods, and a computer-readable storage media for placing a plurality of calls with a common message to a plurality of subscribers are provided. The systems, methods, and a computer-readable storage media include receiving an instruction to place the plurality of calls with the common message to the plurality of subscribers. The instruction includes call information that identifies the plurality of subscribers. One of the plurality of auto-dialers for placing each of the plurality of calls based on the call information is determined, and an instruction is transmitted to each of the plurality of auto-dialers based on results of the determination. The plurality of auto-dialers places the plurality of calls to the plurality of subscribers based on the instruction transmitted to each of the plurality of auto-dialers.

20 Claims, 5 Drawing Sheets

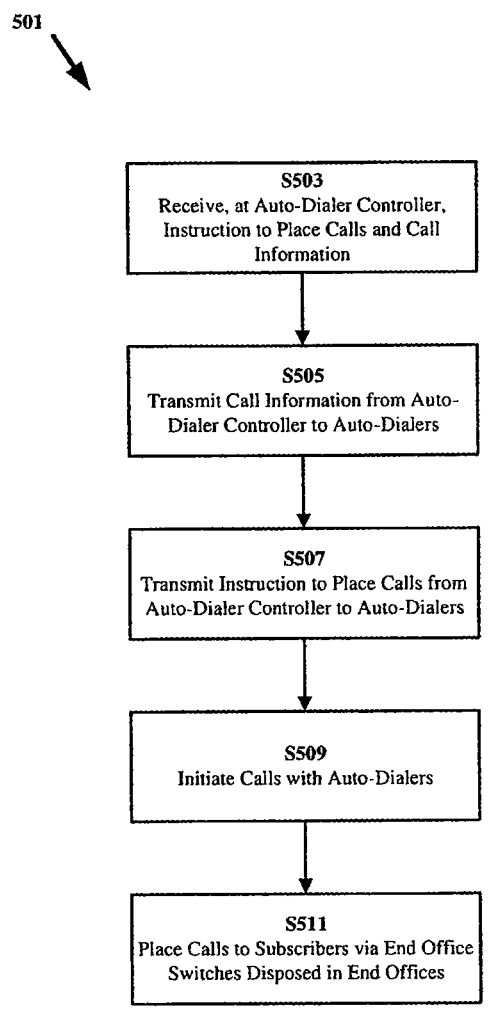

NEXT GENERATION AUTO-DIALER

CROSS REFERENCE TO RELATED APPLICATIONS

The present application is a continuation application of U.S. patent application Ser. No. 12/467,568, filed on May 18, 2009. The disclosure of this document, including the specification, drawings, and claims, is incorporated herein by reference in its entirety.

BACKGROUND

1. Field of the Disclosure

The present disclosure relates to auto-dialers. More particularly, the present disclosure relates to a communications system including an auto-dialer for placing a plurality of calls with a common message to a plurality of subscribers via a public switched telephone network.

2. Background Information

An auto-dialer is an electronic device that automatically places a telephone calls to telephone numbers over a communications network, such as a public switched telephone network. Traditionally, an auto-dialer is located in a single, central location such as a call center or other like facility. The call center, or other like facility, is typically serviced by an end office that provides the call center access to the public switched telephone network. The end office typically includes an end office switch, such as a class 5 switch, and the auto-dialer is typically interconnected with the end office switch via a trunk group. The auto-dialer is able to place calls in rapid succession from the call center and onto the public switched telephone network via the trunk group and the end office switch.

BRIEF DESCRIPTION OF THE DRAWINGS

FIG. 5 is a flowchart of an additional embodiment of a method for placing a plurality of calls with a common message to a plurality of subscribers via a public switched telephone network.

DETAILED DESCRIPTION

Figure 1:
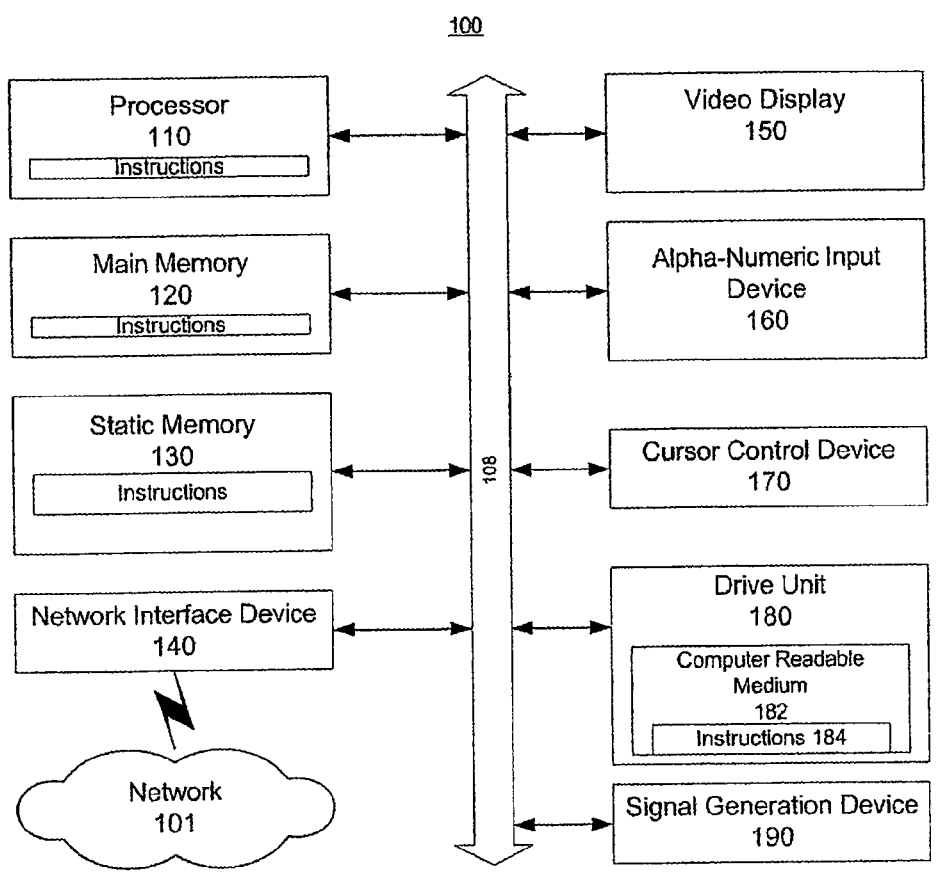
FIG. 1 shows an exemplary general computer system that includes a set of instructions for generating demographic information relating to an individual.

In view of the foregoing, the present disclosure, through one or more of its various aspects, embodiments and/or specific features or sub-components, is thus intended to bring out one or more of the advantages as specifically noted below.

According to an embodiment of the present disclosure, a communications system for placing a plurality of calls with a common message to a plurality of subscribers via a public switched telephone network includes an end office, an end office switch disposed in the end office and in communication with the public switched telephone network, and an auto-dialer disposed in the end office and interconnected with the end office switch for placing the plurality of calls to the plurality of subscribers via the end office switch.

According to one aspect of the present disclosure, the auto-dialer is interconnected with the end office switch via a trunk group.

According to another aspect of the present disclosure, the end office switch is interconnected with the plurality of subscribers via local loop lines.

According to yet another aspect of the present disclosure, the auto-dialer includes an instruction receiver for receiving an instruction to place the plurality of calls to the plurality of subscribers.

According to still another aspect of the present disclosure, the auto-dialer includes switch concentrator circuit information of a switch concentrator circuit of the end office switch for determining an order for placing the plurality of calls.

According to an additional aspect of the present disclosure, the system includes a plurality of end offices, a plurality of end office switches each disposed in one of the end offices and in communication with the public switched telephone network, and a plurality of auto-dialers each disposed in one of the end offices and interconnected with the end office switch disposed in the one of the end offices.

According to another aspect of the present disclosure, the plurality of the auto-dialers each include an instruction receiver for receiving an instruction to place the plurality of calls, and wherein a single instruction is transmitted to each of the instruction receivers.

According to yet another aspect of the present disclosure, the system includes an auto-dialer controller in communication with each of the auto-dialers. The auto-dialer controller receives an instruction to place the plurality of calls, transmits the instruction to each of the auto-dialers, and transmits call information to each of the auto-dialers that corresponds to the plurality of calls to be placed to the plurality of subscribers. Furthermore, the auto-dialers place the plurality of calls to the plurality of subscribers based on the call information transmitted from the auto-dialer controller.

According to another embodiment of the present disclosure, a method for placing a plurality of calls with a common message to a plurality of subscribers via a public switched telephone network includes initiating the plurality of calls with an auto-dialer disposed in an end office, and placing the plurality of calls to the plurality of subscribers via an end office switch disposed in the end office and in communication with the public switched telephone network and interconnected with the auto-dialer.

According to one aspect of the present disclosure, the auto-dialer is interconnected with the end office switch via a trunk group.

According to an additional aspect of the present disclosure, the end office switch is interconnected with the plurality of subscribers via local loop lines.

According to another aspect of the present disclosure, the method includes receiving, by the auto-dialer, an instruction to place the plurality of calls to the plurality of subscribers. Furthermore, the auto-dialer initiates the plurality of calls in response to receiving the instruction.

According to yet another aspect of the present disclosure, the auto-dialer includes switch concentrator circuit information of a switch concentrator circuit of the end office switch, and wherein the auto-dialer initiates the plurality of calls based on the switch concentrator circuit information of the switch concentrator circuit of the end office switch.

According to still another aspect of the present disclosure, the method includes initiating the plurality of calls with a plurality of auto-dialers, each auto-dialer being disposed in one of a plurality of end offices, and placing the plurality of calls to the plurality subscribers via a plurality of end office switches, each end office switch being disposed in one of the end offices and interconnected with one of the auto-dialers.

According to an additional aspect of the present disclosure, the method includes receiving, by the plurality of auto-dialers, an instruction to place the plurality of calls to the plurality of subscribers. Furthermore, the plurality of auto-dialers initiates the plurality of calls in response to receiving the instruction.

According to another aspect of the present disclosure, the method includes, receiving, by an auto-dialer controller, an instruction to place the plurality of calls and call information corresponding to the plurality of calls to be placed to the plurality of subscribers, transmitting the instruction to place the plurality of calls from the auto-dialer controller to the plurality of auto-dialers, and transmitting the call information from the auto-dialer controller to the plurality of auto-dialers. In this regard, the plurality of calls is initiated with the plurality of auto-dialers based on the call information transmitted from the auto-dialer controller.

According to another embodiment of the present disclosure, a tangible computer-readable medium encoded with an executable computer program for placing a plurality of calls with a common message to a plurality of subscribers via a public switched telephone network includes an initiating code segment that initiates the plurality of calls with an auto-dialer disposed in an end office, and a placing code segment that places the plurality of calls to the plurality subscribers via an end office switch disposed in the end office and in communication with the public switched telephone network and interconnected with the auto-dialer.

According to one aspect of the present disclosure, the auto-dialer is interconnected with the end office switch via a trunk group.

According to another aspect of the present disclosure, the tangible computer-readable medium includes a receiving code segment that receives, with the auto-dialer, an instruction to place the plurality of calls to the plurality of subscribers. In this regard, the initiating code segment initiates the plurality of calls in response to the receiving code segment receiving the instruction.

According to yet another aspect of the present disclosure, the auto-dialer includes switch concentrator circuit information of a switch concentrator circuit of the end office switch, and wherein the initiating code segment initiates the plurality of calls based on the switch concentrator circuit information of the switch concentrator circuit of the end office switch.

FIG. 1 is an illustrative embodiment of a general computer system, on which a method to provide a next generation auto-dialer can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
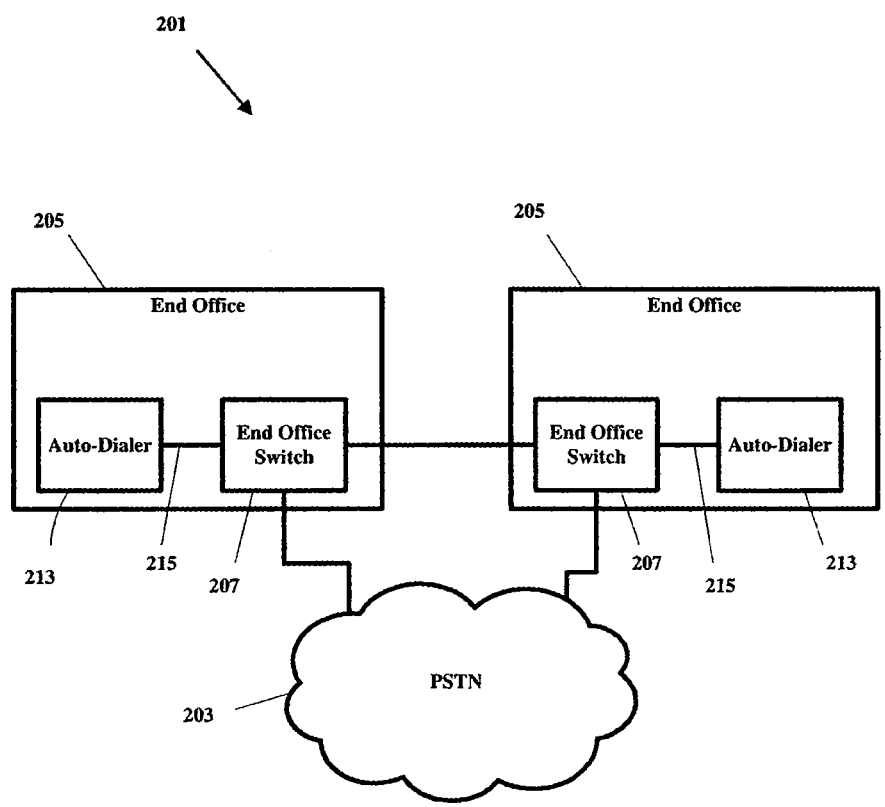
FIG. 2 is a schematic of an embodiment of a communications system for placing a plurality of calls with a common message to a plurality of subscribers via a public switched telephone network.

FIG. 2 generally shows a communications system 201 for placing a plurality of calls with a common message to a plurality of subscribers via a public switched telephone network 203. The communication system includes an end office 205, or other like facility, that provides access to the public switched telephone network 203. Those skilled in the art appreciate that the end office 205 may alternatively be referred to as a central office.

Figure 3:
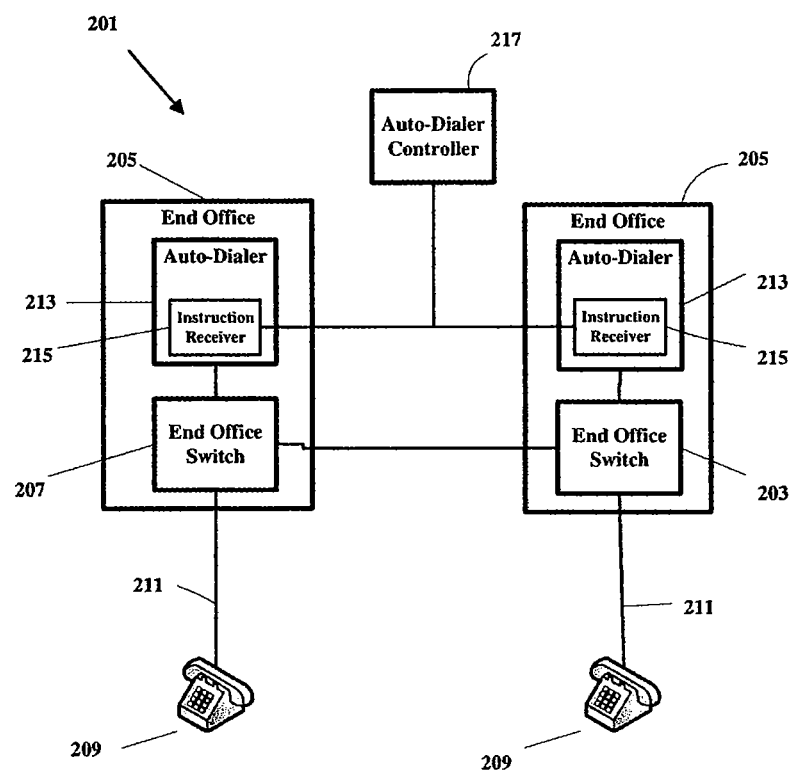
FIG. 3 is a schematic of an additional embodiment of a communications system for placing a plurality of calls with a common message to a plurality of subscribers via a public switched telephone network.

An end office switch 207 is disposed in the end office 205 and is in communication with the public switched telephone network 203. The end office switch is generally a class 5 switch such as, for example, Lucent Technologies 5ESS and Nortel Networks DMS-10. As shown in FIG. 3, the end office switch 207 is generally interconnected with customer premises equipment 209 of the subscribers via local loop, or subscriber, lines 211.

An auto-dialer 213 is disposed in the end office 205 and is interconnected with the end office switch 207 for placing the plurality of calls to the plurality of subscribers via the end office switch 207. In an alternative embodiment of the communications system 201, a plurality of end office switches 207 are disposed in the end office 205 and the auto-dialer is interconnected with each of the plurality of end office switches 207. The auto-dialer 213 is generally interconnected with each end office switch 207 via a trunk group 215. Those skilled in the art appreciate that in additional embodiments of the communications system 201 the auto-dialer 213 may be a predictive dialer, a power dialer, or any other automated dialer commonly known in the art.

In the embodiment of the communications system 301 as shown in FIG. 3, the auto-dialer 213 includes an instruction receiver 215 for receiving an instruction to place the plurality of calls to the plurality of subscribers. The instruction may include call information that comprises the message to be delivered to the plurality of subscribers and/or information that identifies the plurality of subscribers to which the message is to be delivered. In an exemplary embodiment of the communications system 201, the receiver 215 of the auto-dialer 213 is configured to receive an instruction from a police department, a fire department, or a school district to place a plurality of calls to a plurality of subscribers to deliver a message comprising a severe weather warning or a school closure notice. In alternative embodiments, those skilled in the art appreciate that the receiver 215 of the auto-dialer 213 may receive instructions from additional sources for different purposes such as, but not limited to, delivering information, lead generation, conducting surveys, promotions, sweepstakes, and sending out reminders.

The auto-dialer 213 may include switch concentrator circuit information of a switch concentrator circuit of the end office switch 207 for determining an order for placing the plurality of calls to the plurality of subscribers. In this regard, based on the switch concentrator circuit information, the auto-dialer 213 can efficiently determine the order in which the plurality of calls is placed such that the greatest number of subscribers receive the common message. Furthermore, the auto-dialer 213 may be configured to detect switch or trunk group overload conditions based on the switch concentrator circuit information and to adjust the frequency and/or the route in which the plurality of calls is placed to prevent switch concentrator blocking. In an exemplary embodiment, the switch concentrator circuit information is line card to telephone number information of the end office switch 207 along with information of other switches so that the auto-dialer 213 can efficiently determine the order in which the plurality of calls is placed to the plurality of subscribers.

As shown in FIG. 2, the communication system 201 may include a plurality of end offices 205, a plurality of end office switches 207 that are each disposed in one of the end offices 205 and that are each in communication with the public switched telephone network 203, and a plurality of auto-dialers 213 that are each disposed in one of the end offices 205 and that are in communication with the end office switch 207 disposed in the corresponding end office 205. In such an embodiment, each auto-dialer 213 may include an instruction receiver 215 for receiving an instruction to place the plurality of calls to the plurality of subscribers. A single instruction can be transmitted simultaneously to the instruction receiver 215 of each of the plurality of auto-dialers 213, or, alternatively, the instruction receiver 215 of each auto-dialer 213 can receive an instruction to place a plurality of calls independently of the other auto-dialers 213.

In an embodiment of the communications system, an auto-dialer controller 217 is in communication with each auto-dialer 213. The auto-dialer controller 217 may receive the instruction to place the plurality of calls and may transmit the instruction to each of the auto-dialers. The auto-dialer controller 217 also may receive call information, such as a telephone number of each of the subscribers to which the plurality of calls is to be placed and/or a message that is to be delivered to each of the subscribers. The auto-dialer controller 217 may determine an appropriate auto-dialer 213 for placing the call to each of the plurality of subscribers based on the call information and may transmit the call information to the corresponding auto-dialer 217.

Figure 4:
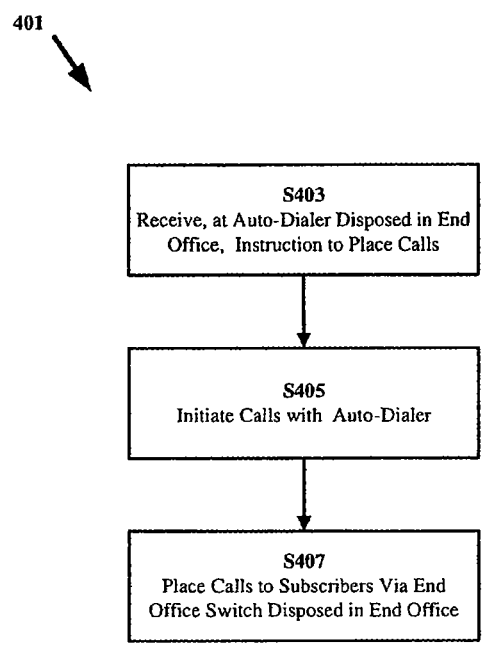
FIG. 4 is a flowchart of an embodiment of a method for placing a plurality of calls with a common message to a plurality of subscribers via a public switched telephone network.

In another embodiment of the present disclosure, as shown in FIG. 4, a method for placing a plurality of calls with a common message to a plurality of subscribers via a public switched telephone network is generally shown at 401. The method 401 includes, at step S403, receiving, by an auto-dialer disposed in an end office, an instruction to place the plurality of calls to the plurality of subscribers. At step S405, the plurality of calls is initiated with the auto-dialer in response to receiving the instruction and, at step S407, the plurality of calls is placed to the plurality of subscribers via an end office switch. The end office switch is disposed in the end office, is in communication with the public switched telephone network, and is interconnected with the auto-dialer. In step S407, the plurality of calls is placed from the auto-dialer to the end office switch via a trunk group that interconnects the auto-dialer and the end office switch. The plurality of calls may be placed from the end office switch to the subscribers via local loop lines, or subscriber lines, that interconnect the end office switch and the plurality of subscribers. In the method 401, the auto-dialer may include switch concentrator circuit information of a switch concentrator circuit of the end office switch, and, in step S405, the plurality of calls may be initiated by the auto-dialer based on the switch concentrator circuit information of the switch concentrator circuit of the end office switch.

In an alternative embodiment of the method 401 shown in FIG. 4, a method for placing a plurality of calls with a common message to a plurality of subscribers via a public switched telephone network is generally shown at 501 in FIG. 5. The method 501 includes, at step S503, receiving, by an auto-dialer controller, an instruction to place the plurality of calls and call information corresponding to the plurality of calls to be placed. At step S505, the call information is transmitted from the auto-dialer controller to the plurality of auto-dialers. At step S507, the instruction to place the plurality of calls is transmitted from the auto-dialer controller to a plurality of auto-dialers each disposed in an end office. At step S509, the plurality of auto-dialers initiate the plurality of calls based on the call information, and, at step S511, the plurality of calls is placed from the plurality of auto-dialers to the plurality of subscribers via a plurality of end office switches. In step S511, each end office switch is disposed in one of the end offices and interconnected with one of the auto-dialers disposed therein.

The present disclosure also provides a tangible computer-readable medium encoded with an executable computer program for placing a plurality of calls with a common message to a plurality of subscribers via a public switched telephone network. The tangible computer-readable medium includes an initiating code segment that initiates the plurality of calls with an auto-dialer disposed in an end office, and a placing code segment that places the plurality of calls to the plurality subscribers via an end office switch disposed in the end office and in communication with the public switched telephone network and interconnected with the auto-dialer. The auto-dialer may be interconnected with the end office switch via a trunk group. Additionally, the auto-dialer may include switch concentrator circuit information of a switch concentrator circuit of the end office switch. In this regard, the initiating code segment may initiate the plurality of calls based on the switch concentrator circuit information of the switch concentrator circuit of the end office switch to prevent switch concentrator blocking.

In an embodiment of the tangible computer-readable medium, the tangible computer-readable medium further includes a receiving code segment that receives, with the auto-dialer, an instruction to place the plurality of calls to the plurality of subscribers. In this regard, the initiating code segment may initiate the plurality of calls in response to the receiving code segment receiving the instruction.

Accordingly, the present invention enables a plurality of calls to be placed with an auto-dialer to a plurality of subscribers via a public switched telephone network while eliminating trunk group blocking and switch blocking. An auto-dialer is installed in each end office with a trunk group connected to the end office switch(es) disposed in that end office. An instruction is sent to a specific auto-dialer or to a plurality of auto-dialers, and the calls are initiated by the auto-dialers within each end office, thereby eliminating inter-office switch blocking. Furthermore, since each auto-dialer includes switch concentrator circuit information of a switch concentrator circuit of the end office switch(es) that the auto-dialer is interconnected with, the auto-dialer can efficiently order calling to eliminate switch concentrator blocking.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, the auto-dialer described herein may be any type of automatic dialer such as, but not limited to, an auto-dialer, a predictive dialer, and a power dialer. Furthermore, while the auto-dialer is described as being interconnected with the end office switch via a trunk group, those skilled in the art appreciate that alternative connections may also be employed. Additionally, those skilled in the art further appreciate that the communication system described herein may be used for any purpose such as, but not limited to, delivering information, lead generation, conducting surveys, promotions, sweepstakes, and sending out reminders.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission of communication systems represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R.§1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for placing a plurality of calls with a common message to a plurality of subscribers, the system comprising:
    a plurality of auto-dialers;
    a processor in communication with each of the plurality of auto-dialers; and
    a memory storing instructions that, when executed by the processor, cause the processor to perform operations including:
    receiving an instruction to place the plurality of calls with the common message to the plurality of subscribers, the instruction including call information that identifies the plurality of subscribers;
    determining one of the plurality of auto-dialers for placing each of the plurality of calls based on the call information; and
    transmitting an instruction to each of the plurality of auto-dialers based on results of the determining,
    wherein the plurality of auto-dialers places the plurality of calls to the plurality of subscribers based on the instruction transmitted from the processor to each of the plurality of auto-dialers.

2. The system as set forth in claim 1, wherein
    the plurality of auto-dialers are interconnected with a plurality of end office switches, each of the plurality of end office switches being in communication with a public switched telephone network, and
    the plurality of auto-dialers places the plurality of calls to the plurality of subscribers on the public switched telephone network via the plurality of end office switches.

3. The system as set forth in claim 2, wherein each of the plurality of end office switches and each corresponding one of the plurality of auto-dialers is disposed in one of a plurality of end offices.

4. The system as set forth in claim 3, wherein each of the plurality of auto-dialers is configured to determine an order for placing the plurality of calls to the plurality of subscribers.

5. The system as set forth in claim 4, wherein each of the plurality of auto-dialers includes switch concentrator circuit information of a switch concentrator circuit of a corresponding one of the plurality of end office switches for determining the order for placing the plurality of calls to the plurality of subscribers.

6. The system as set forth in claim 2, wherein each of the plurality of auto-dialers is interconnected with one of the plurality of end office switches via a trunk group.

7. The system as set forth in claim 1, wherein each of the plurality of auto-dialers is configured to determine an order for placing the plurality of calls to the plurality of subscribers.

8. The system as set forth in claim 1, wherein each of the plurality of auto-dialers is configured to adjust a frequency in which the plurality of calls is placed to the plurality of subscribers.

9. The system as set forth in claim 1, wherein the plurality of auto-dialers places the plurality of calls to the plurality of subscribers via the public switched telephone network.

10. A method for placing a plurality of calls with a common message to a plurality of subscribers, the method comprising:
    receiving, by a processor, an instruction to place the plurality of calls with the common message to the plurality of subscribers, the instruction including call information that identifies the plurality of subscribers;
    determining, by the processor, one of a plurality of auto-dialers for placing each of the plurality of calls based on the call information;
    transmitting, by the processor, an instruction to each of the plurality of auto-dialers based on results of the determining; and
    placing the plurality of calls to the plurality of subscribers with the plurality of auto-dialers based on the instruction transmitted from the processor to each of the plurality of auto-dialers.

11. The method as set forth in claim 10, wherein the plurality of auto-dialers are interconnected with a plurality of end office switches, each of the plurality of end office switches being in communication with a public switched telephone network, the method further comprising:
    placing the plurality of calls to the plurality of subscribers with the plurality of auto-dialers on the public switched telephone network via the plurality of end office switches.

12. The method as set forth in claim 11, wherein
    each of the plurality of end office switches and each corresponding one of the plurality of auto-dialers is disposed in one of a plurality of end offices, and
    the plurality of calls are placed from the plurality of end offices.

13. The method as set forth in claim 12, further comprising:
    determining, by each of the plurality of auto-dialers, an order for placing the plurality of calls to the plurality of subscribers.

14. The method as set forth in claim 13, wherein each of the plurality of auto-dialers determines the order for placing the plurality of calls to the plurality of subscribers using switch concentrator circuit information of a switch concentrator circuit of a corresponding one of the plurality of end office switches.

15. The method as set forth in claim 10, wherein the plurality of auto-dialers places the plurality of calls to the plurality of subscribers via the public switched telephone network.

16. A non-transitory computer-readable storage medium having an executable computer program for placing a plurality of calls with a common message to a plurality of subscribers that, when executed by a processor, causes the processor to perform operations comprising:

receiving an instruction to place the plurality of calls with the common message to the plurality of subscribers, the instruction including call information that identifies the plurality of subscribers;

determining one of a plurality of auto-dialers for placing each of the plurality of calls based on the call information;

transmitting an instruction to each of the plurality of auto-dialers based on results of the determining; and placing the plurality of calls to the plurality of subscribers with the plurality of auto-dialers based on the instruction transmitted to each of the plurality of auto-dialers.

17. The non-transitory computer-readable storage medium as set forth in claim 16, wherein the plurality of auto-dialers are interconnected with a plurality of end office switches, each of the plurality of end office switches being in communication with a public switched telephone network, the operations further comprising:

placing the plurality of calls to the plurality of subscribers plurality with the plurality of auto-dialers on the public switched telephone network via the plurality of end office switches.

18. The non-transitory computer-readable storage medium as set forth in claim 17, wherein each of the plurality of end office switches and each corresponding one of the plurality of auto-dialers is disposed in one of a plurality of end offices, and the plurality of calls are placed from the plurality of end offices.

19. The non-transitory computer-readable storage medium as set forth in claim 18, further comprising:

determining an order for placing the plurality of calls to the plurality of subscribers for each of the plurality of auto-dialers.

20. The non-transitory computer-readable storage medium as set forth in claim 19, wherein each of the plurality of auto-dialers determines the order for placing the plurality of calls to the plurality of subscribers using switch concentrator circuit information of a switch concentrator circuit of a corresponding one of the plurality of end office switches.

* * * * *